United States Patent
Leggetter et al.

(10) Patent No.: US 7,191,130 B1
(45) Date of Patent: Mar. 13, 2007

(54) METHOD AND SYSTEM FOR AUTOMATICALLY OPTIMIZING RECOGNITION CONFIGURATION PARAMETERS FOR SPEECH RECOGNITION SYSTEMS

(75) Inventors: Christopher J. Leggetter, Palo Alto, CA (US); Michael M. Hochberg, Sunnyvale, CA (US)

(73) Assignee: Nuance Communications, Menlo Park, CA (US)

( * ) Notice: Subject to any disclaimer, the term of this patent is extended or adjusted under 35 U.S.C. 154(b) by 923 days.

(21) Appl. No.: 10/260,383

(22) Filed: Sep. 27, 2002

(51) Int. Cl.
*G01L 15/04* (2006.01)
(52) U.S. Cl. ........................ 704/254; 704/251
(58) Field of Classification Search ......... 704/251–255
See application file for complete search history.

(56) References Cited

U.S. PATENT DOCUMENTS

| | | | | |
|---|---|---|---|---|
| 4,763,278 A | * | 8/1988 | Rajasekaran et al. | 704/251 |
| 4,780,906 A | * | 10/1988 | Rajasekaran et al. | 704/251 |
| 5,515,475 A | * | 5/1996 | Gupta et al. | 704/254 |
| 5,613,037 A | * | 3/1997 | Sukkar | 704/256 |
| 5,819,222 A | * | 10/1998 | Smyth et al. | 704/256.1 |
| 6,092,045 A | * | 7/2000 | Stubley et al. | 704/254 |
| 6,212,498 B1 | * | 4/2001 | Sherwood et al. | 704/244 |
| 6,275,802 B1 | * | 8/2001 | Aelten | 704/255 |
| 6,292,779 B1 | * | 9/2001 | Wilson et al. | 704/257 |
| 6,751,595 B2 | * | 6/2004 | Busayapongchai et al. | 704/275 |
| 6,799,162 B1 | * | 9/2004 | Goronzy et al. | 704/244 |
| 6,839,669 B1 | * | 1/2005 | Gould et al. | 704/246 |

* cited by examiner

*Primary Examiner*—Michael N. Opsasnick
(74) *Attorney, Agent, or Firm*—Blakely, Sokoloff, Taylor & Zafman LLP (57) ABSTRACT

The present invention introduces a system and method for automatically optimizing recognition configuration parameters for speech recognition systems. In one embodiment, a method comprises receiving an utterance at a speech recognizer, wherein the speech recognizer has a learning mode. The speech recognizer is run in a learning mode to automatically generate tuned configuration parameters. Subsequent utterances are recognized with the tuned configuration parameters to generate future recognition results.

47 Claims, 5 Drawing Sheets

METHOD AND SYSTEM FOR AUTOMATICALLY OPTIMIZING RECOGNITION CONFIGURATION PARAMETERS FOR SPEECH RECOGNITION SYSTEMS

FIELD OF THE INVENTION

The present invention relates to the field of speech recognition. In particular the present invention discloses a system and method for automatically optimizing recognition configuration parameters for speech recognition systems.

BACKGROUND OF THE INVENTION

Speech recognition systems are currently in use for responding to various forms of commerce via a variety of communication channels such as the telephone network, internet, etc. One example of such a system is utilized in conjunction with a stock brokerage. According to this system, a caller can provide his or her account number, obtain a quotation for the price of a particular stock issue, purchase or sell a particular number of shares at market price or a particular target price among other types of transactions. Natural language systems can also be used to respond to such things as requests for telephone directory assistance.

Speech recognition systems typically are configurable, within limits, as to the amount of processing power, memory, network bandwidth, and other system resources that they may consume. Often, memory, speed, and accuracy can be traded off against each other. For instance, a particular configuration of one system may use less CPU resources than another, possibly at the cost of lower average speech recognition accuracy. Typical systems have default configurations that provide nominal accuracy and resource consumption across a wide range of recognition tasks. System configuration is often done only once or never, or left at default values, resulting in a particular resource/performance tradeoff for the particular deployment. Often the configuration parameters are only determined during the initial deployment of the system. Usually, a system developer calculates the parameters and only changes them during a manual reconfiguration.

Known systems determine and specify optimized recognition configuration parameters using an offline process. Speech waveform data is collected from the application, and then orthographically transcribed to specify the "reference" word sequence for each utterance. This data is then passed through a simulation of the recognition system in an offline process using a selection of configurations to determine the parameters. Finally, a decision is made by the system developers as to which configuration is used. Typically a different configuration is determined for each grammar or dialogue state in the system, which makes the process time consuming.

There are a number of issues, which make this offline process a burden for the developer. This burden exists because (a) it takes time and resources to run the simulations, (b) it requires collecting and transcribing data before the system is deployed, (c) it does not take into account how the usage of the system may change over time, and (d) it may require special skills which may not be readily available. The overall effect of these issues are that it adds expense (resources) and delay to the deployment of the system.

SUMMARY OF THE INVENTION

The present invention introduces a system and method for automatically optimizing recognition configuration parameters for speech recognition systems. In one embodiment, a method comprises receiving an utterance at a speech recognizer, wherein the speech recognizer has a learning mode. The speech recognizer is run in a learning mode to automatically generate tuned (i.e. optimized) configuration parameters for a particular set of recognition tasks. The utterance is recognized with the tuned configuration parameters to generate a recognition result.

Other features of the present invention will be apparent from the accompanying drawings and from the detailed description which follows.

BRIEF DESCRIPTION OF THE DRAWINGS

The objects, features and advantages of the present invention will be apparent to one skilled in the art in view of the following detailed description in which.

DETAILED DESCRIPTION

A system and method for automatically optimizing recognition configuration parameters for speech recognition systems are described. Optimizing recognition configuration parameters refers to the process of optimizing the configuration parameters with respect to an objective function. For speech recognition systems, the objective function often represents the trade-off between recognition accuracy and required computation (CPU usage), although the objective function may also use other criteria such as memory usage or latency. Typically, the optimization is carried out for a particular recognition task or set of recognition tasks, as will be described in greater detail below. In one embodiment, a method comprises receiving an utterance at a speech recognizer, wherein the speech recognizer has a learning mode. The speech recognizer is run in a learning mode to automatically generate tuned (i.e. optimized) configuration parameters for a particular set of recognition tasks. The utterance is recognized with the tuned configuration parameters to generate a recognition result.

The techniques described herein may be implemented using one or more general purpose computers selectively activated or configured by computer software stored in the computer or elsewhere. Such computer software may be stored in a computer readable storage medium, such as, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently constrained to any particular type of computer or other system. Various general purpose systems may be used with programs in accordance with the teachings herein, or it may prove convenient to construct more specialized system to perform the required method steps. The required structure for a variety of these systems will be apparent from the description below. In addition, any of a variety of programming languages may be used to implement the teachings of the techniques described herein.

Note that in this description, references to "one embodiment" or "an embodiment" mean that the feature being referred to is included in at least one embodiment of the present invention. Further, separate references to "one embodiment" in this description do not necessarily refer to the same embodiment, however, neither are such embodiments mutually exclusive, unless so stated and except as will be readily apparent to those skilled in the art.

Figure 1:
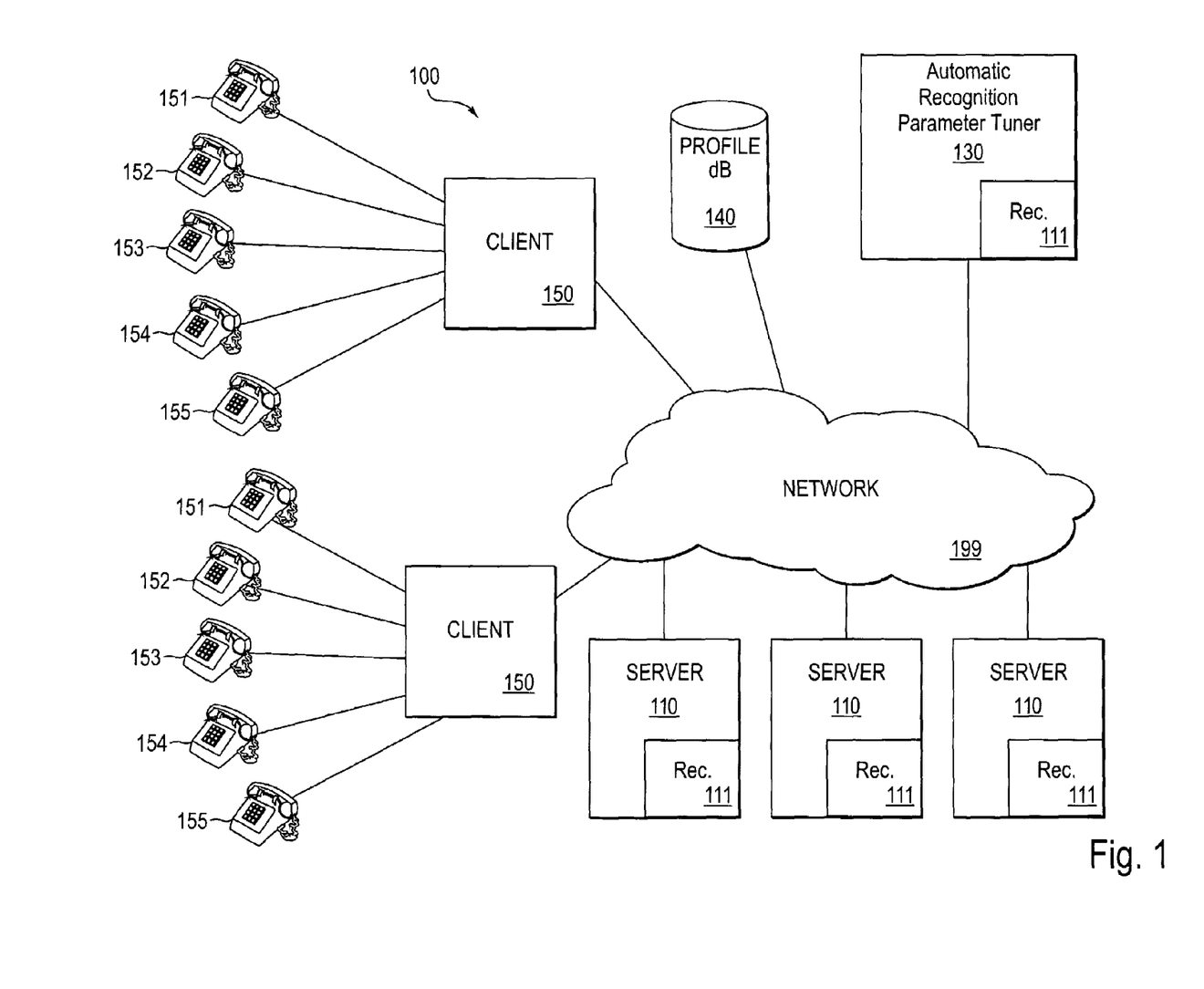
FIG. 1 is a high-level block diagram of an exemplary speech recognition system according to one embodiment of the present invention.

The techniques and elements described herein may be included within a speech recognition system 100 such as that illustrated in FIG. 1. According to the embodiment depicted in FIG. 1, one or more servers 110 communicate to a plurality of clients 150. The clients 150 may transmit and receive data from servers 110 over a variety of communication media including (but not limited to) a local area network and/or a larger network 199 (e.g., the Internet). Servers 110 include a recognizer 111 for interpreting utterances provided by callers 151–155.

Clients 150 service callers 151–155. Callers 151–155 may be analog or digital telephones, cellular phones or other similar device capable of transmitting and receiving voice. Communication channels such as PST, wireless communication via satellite broadcast, conventional cellular network, such as TDMA, CDMA, or GSM (not shown) can additionally (or alternatively) be used to connect the callers 151–155 to the clients 150. Database 140 can store various types of data. This data may include, for example, specific caller data (e.g., caller account information and caller preferences) and/or more general data. Database 140 can also include voice prints that are used to verify a caller's 151–155 identity. Database 140 in one embodiment runs an instance of a Relational Database Management System (RDBMS), such as Microsoft™ SQL-Server, Oracle™ or the like.

A user/client may interact with and receive feedback from servers 110 using various different communication devices and/or protocols. According to one embodiment, a user connects to servers 110 via client software residing on a client 150.

System 100 also includes an automatic recognition parameter tuner 130. The tuner 130 considers what resources are available to system 100 to automatically determine the best recognizer parameter configuration for a particular application in terms of a speed/accuracy tradeoff, as is described below. Tuner 130 includes a recognizer 111, for which it tunes configuration parameters. In an alternate embodiment, tuner 130 tunes configuration parameters for recognizers in servers 110. In yet another embodiment, the functions of tuner 130 are performed entirely by recognizer 111.

Figure 2:
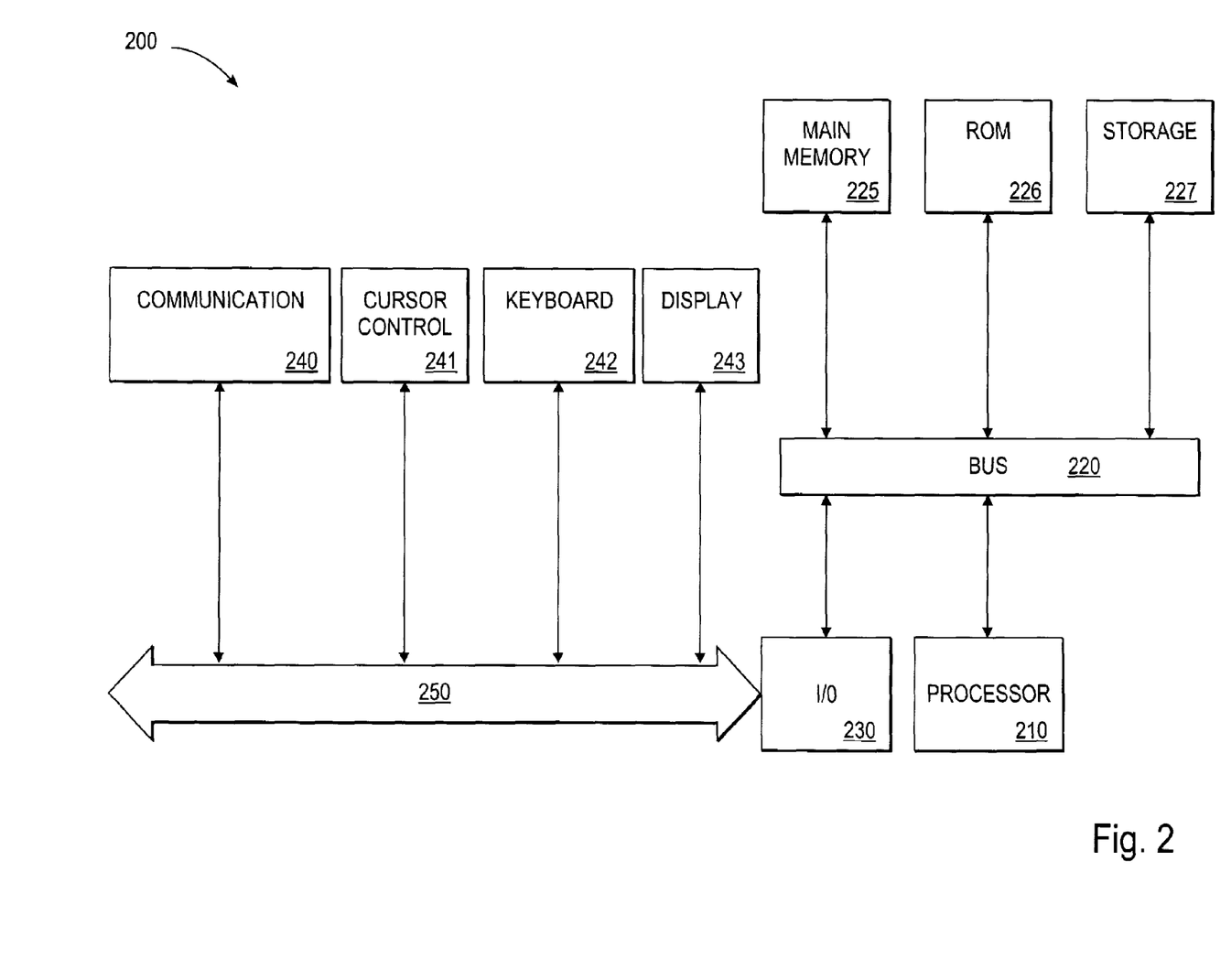
FIG. 2 is an exemplary block diagram of a computer architecture used to implement embodiments of the present invention.

Having described an exemplary network architecture, which employs various elements of the present invention, a computer system 200 representing exemplary clients 150, servers 110, and/or tuner 130 in which elements of the present invention may be implemented will now be described with reference to FIG. 2.

One embodiment of computer system 200 comprises a system bus 220 for communicating information, and a processor 210 coupled to bus 220 for processing information. Computer system 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Computer system 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Computer system 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). For example, a graphical user interface for system configuration and maintenance may be presented to a system administrator on the display device 243.

The communication device 240 is for accessing other computers (servers or clients) via a network 199. The communication device 240 may comprise a modem, a network interface card, or other well known interface device, such as those used for coupling to Ethernet, token ring, or other types of networks.

It should be noted, however, that the described techniques are not limited to use in speech recognition systems, nor are they limited in application to speech signals or to any particular type of signal. In a speech recognition system such as the one shown in FIG. 1, multiple functions and tasks may be performed. System 100 may be used for recognizing a caller, 151–155 verifying that a caller 155 is who he or she claims to be. Specific examples include, using voice responses to listen to credit and banking information, or voice activated systems used by airlines and other transportation agencies, automated operator systems, etc.

Figure 3:
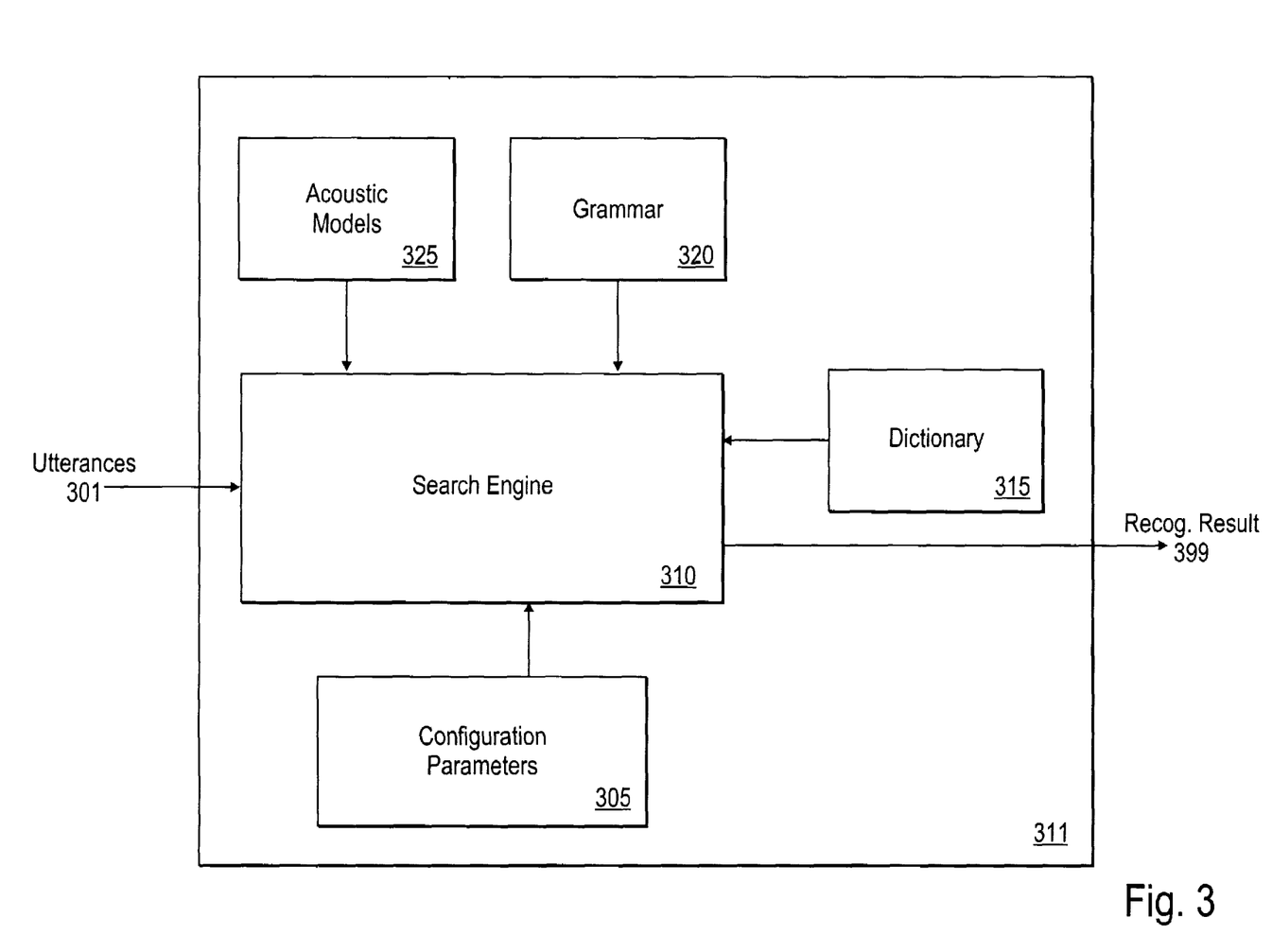
FIG. 3 illustrates a functional block diagram of recognizer according to one embodiment.

FIG. 3 illustrates a functional block diagram of recognizer 311. Recognizer 311 can be implemented within servers 110 or independently. The basic building block of recognizer 311 is search engine 310, which takes in utterances 301, searches for and then returns a recognition result 399 or a set of recognition results for N-Best recognition. The recognition result may contain such information as the recognized word string, the semantic interpretation of the utterance and/or the confidence scores.

In order to provide recognition result 399, search engine 310 accesses acoustic models 325 that describe a mapping of natural speech to a sequence of symbols representing the underlying sounds, e.g., phonemes. In addition, search engine 310 uses grammars 320 to generate recognition result 399. Grammars 320 are language models that define allowable phonetic and/or word sequences and specify the probabilities of these sequences. Grammars include statistical language models (e.g., trigrams) as well as standard finite-state grammars. Word Dictionary 315 takes the phonetic sequences and provides search engine 310 with words. The search engine 310 operates in accordance with recognition configuration parameters 305. The method and system described herein provide for the automatic tuning of these parameters.

In one embodiment, the performance level for a particular recognition task is determined by a set of recognizer configuration parameters 305 which specify the level of detail, and the proportion of the complete search space the recognizer 311 should evaluate to produce the recognized result 399. The size of the search space is constant and the portions analyzed in the searching process can be adjusted. The more detailed and bigger the search, the more accurate the recognizer 311 is, but also the more CPU cycles it takes to reach the answer.

A speech recognition application is typically comprised of a sequence of one or more dialogue states. For each dialogue state, there is a—possibly non-unique—recognition task requiring a dialogue-state-specific grammar 320 and parameter configuration 305. Each recognition configuration specifies a speed/accuracy (or more generally, a resource/accuracy) performance level.

For example:
1. recognition is very fast, but less accurate.
2. recognition is somewhat fast, and more accurate.
3. recognition is slow, and most accurate.

The speed/accuracy trade-off is important, because in a live speech recognition system the recognizer must respond in a reasonable amount of time to meet the caller's expectations. Too much computation (CPU usage) will result in long latencies, and frustrated users. Latency involves how quickly system 100 responds to a caller 151–155 after an utterance is spoken. Further, in systems where multiple recognition requests are handled using the same CPU resources, less computation means higher simultaneous recognition capacity. For this reason, recognition systems are typically deployed with a configuration that achieves the highest possible accuracy while still meeting the deployment resource efficiency criteria.

Known systems also have drawbacks when considered in the context of dynamically changing applications. Dynamically changing applications are becoming more common. Examples of such applications are:
   a) Personal Calling Lists—a user can customize his or her own list of names to call by voice activated dialing
   b) Real-time data presentation—eg. a user getting email over the phone, wants to select a particular message; and
   c) VoiceXML applications—the recognizer points to a Voice page, which can be generated dynamically from changing content.

In all of these cases, the grammar used for recognition is not available in advance for developers to tune the recognition system with speech data. If and when these grammars become available, it is highly impractical and expensive for the developer to continually tune the system to the changing grammars.

Tuner 130 improves recognition of these utterances, as well as system latency. Thus system 100 can optimize the accuracy of the utterance recognition while still meeting constraints on system response. This is known as a speed/accuracy tradeoff. However, most objective speech recognition factors, including memory requirement considerations, can be used as an optimization goal.

System 100 self-determines the best configuration for use with each dialogue state in grammar set 320.

At any one time the recognizer 311 is in one of two modes:
   1) Recognition only; or
   2) Recognition and learning mode.

In recognition only mode the most recently updated/learned configuration parameters are used for recognition. Initial conditions can be fixed by a system administrator when the recognizer 311 is deployed or the recognizer 311 can be left in the default system configuration.

In recognition and learning mode the recognizer 311 uses a specific configuration set up for learning. This runs the recognizer 311 in a manner, which allows it to simulate the effect of running with different candidate (hypothetical) configurations. The recognition results which would be generated by each of these hypothetical configurations are then analyzed to see which configurations introduced errors, and which produced answers corresponding to the reference recognition result. In addition the recognizer 311 returns the reference recognition result 399 as the result of the recognition. The reference recognition result is determined by the way system 100 is configured. If the automatic recognition parameter tuner 130 is run in a supervised manner whereby the true transcriptions are available to recognizer 311, then the reference transcriptions are indeed the true transcription values. If the true transcriptions are not available, the automatic recognition parameter tuner 130 uses the result of one of the expensive hypothetical configurations as the reference recognition result.

Statistics of the performance of each of the hypothetical configurations are accumulated over one or more learning examples, and the recognition configuration for the grammar is periodically updated to reflect the best of the hypothetical configurations.

Figure 4:
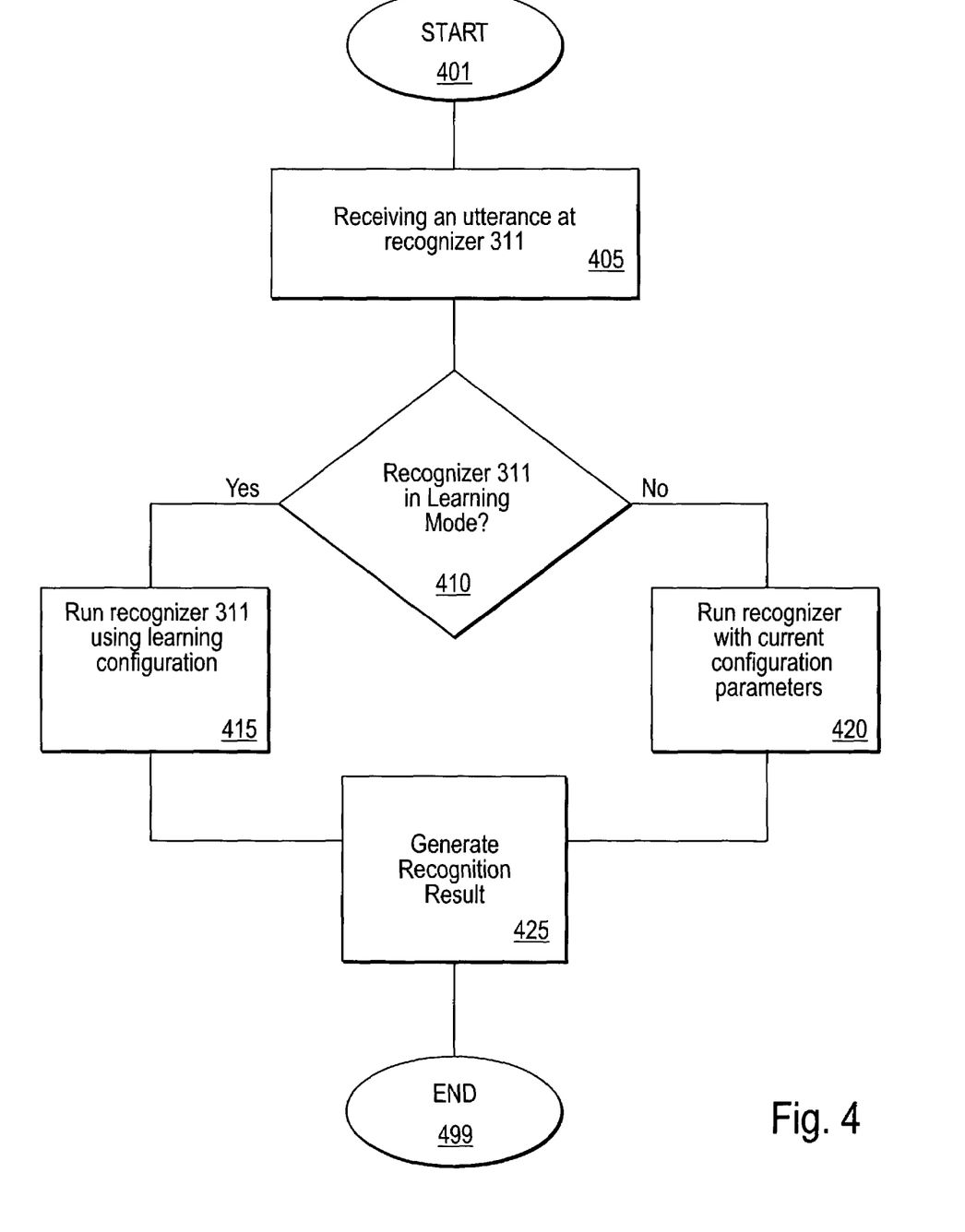
FIG. 4 shows an example of the processing flow of a speech recognition system according to one embodiment of the present invention.

FIG. 4 illustrates the processing flow of a speech recognition system according to one embodiment of the present invention. The process commences at block 401. At processing block 405, the recognizer 311 receives an utterance. The utterance can be generated by a caller 151–155. Flow continues to decision block 410, where recognizer 311 determines if it should enter learning mode. If the recognizer 311 is to run in learning mode, flow is passed to processing block 415. If the recognizer 311 is not in learning mode, the flow continues to processing block 420.

At processing block 415, the recognizer 311 is run to learn new configuration parameters as well as perform recognition. Process 415 will be described in greater detail below in connection with FIG. 5. If there is no learning, flow is at processing block 420. At block 420, a current recognition configuration is determined from a history of statistics accumulated previously or from the developer specified configuration.

After blocks 415 and 420 are processed, flow continues to processing block 425 where the recognition result is generated and provided. The process ends at block 499.

Figure 5:
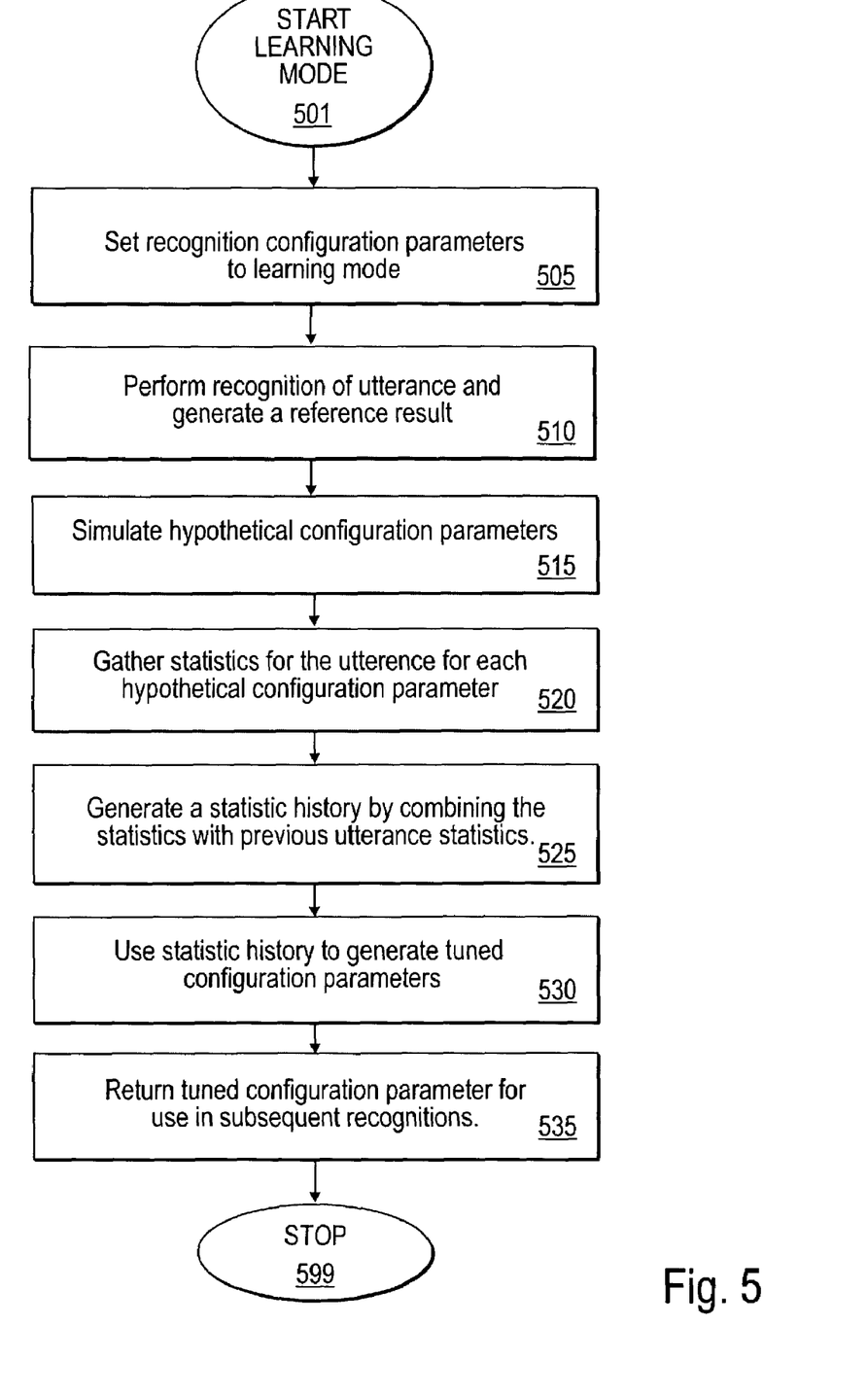
FIG. 5 shows an example of the processing flow of a speech recognition system for tuning configuration parameters, according to one embodiment of the present invention.

FIG. 5 shows an example of the processing flow of a speech recognition system for tuning configuration parameters, such as the process described in block 415 of FIG. 4. The learning mode process begins at start block 501. Flow continues to processing block 505. At processing block 505, the recognition configuration parameters are set to learning mode. Learning mode parameters allow for determination of the tuning of the configuration parameters. Flow continues to processing block 510 where recognizer 311 performs recognition of the utterance and generates a reference result.

At processing block 515, recognizer 311 simulates hypothetical configuration parameters. This can occur simultaneously with the recognition processing or independently. Flow continues to processing block 520. Recognizer 311 gathers statistics associated with the utterance for each hypothetical configuration. The statistics gathered may include per-utterance statistics, such as the identity of the active grammar; whether the recognition result matched the reference result; and the amount of CPU computation required.

Flow continues to processing block 525 where recognizer 311 generates a statistic history by combining the statistics of previous utterances with the statistics gathered at processing block 520. Statistic history terms, such as the number of times a grammar is used, the number of times the grammar generates the reference recognition result, and variance, and minimum/maximum usage values can be computed at this stage. At processing block 530, the statistic history is used to tune the configuration parameters. Flow continues to processing block 535 where recognizer 311 returns a set of tuned configuration parameters for use in subsequent recognitions.

The flow continues to stop block 599 where the process terminates.

The statistics are generated on a per grammar or dialogue state basis. The statistics for each hypothesis will accumulate such information as:
1) Number of times grammar used;
2) Number times matched assumed truth; and
3) Statistics on the amount of computation used with this candidate (average amount of computation, variance, min/max usage values etc.) plus any other information that is relevant to determining the candidates operating point based on the objective function.

Further, if the reference result is proved incorrect, then the statistics from the utterance can be discarded. An answer can be deemed incorrect from the dialogue interaction with the user (e.g. a "no" in the following confirmation state may indicate that the reference answer was incorrect) or by using confidence metrics generated by the recognizer (e.g. the recognizer is only 10% sure of the result).

Given such statistics it is feasible to take a small degradation in accuracy for a significant reduction in the amount of computation by the CPU. It is envisioned that the tradeoff could be controlled by the system administrator who can for example specify that the maximum degradation in accuracy tolerable is 1%. Alternatively, the process could be completely automated.

At some point spare CPU is available to perform the learning e.g. during periods with low call volume. This leads to different embodiments of the present method and system:
a) The self-learning is turned on in the early phase of a deployment when it is known that the system has not been well optimized for the actual caller population. The self-learning functionality either automatically turns itself off after learning the optimal configuration, or is turned off after a period of time, or after having seen sufficient speech samples for each grammar. After this initial phase the learning is turned off and the application runs in standard mode.
b) The self-learning mode is switched on or off depending on the current computational load (CPU usage) of system 100. In low usage time-periods (e.g. the middle of the night) the recognition requests can be infrequent and the computational load (CPU usage) low. "Low" means an amount of CPU computation that is below a predetermined threshold. At such times the extra CPU used for learning will not impact latency. Low computational load (CPU usage) determinations are described in:
"Method and System for Dynamically Improving Performance of Speech Recognition or Other Speech Processing Systems," by Ashvin Kannan, Hy Murveit, Christopher Leggetter, Michael Schuster, filed on Jan. 31, 2001 as U.S. patent application Ser. No. 09/773,996, which is incorporated herein by reference; and
c) The self-learning is switched on periodically either automatically or for the specific purpose to retune the configuration parameters 305. Once such purpose, is for example if a dynamic grammar has recently been updated.

Having discussed the present method and system at a high-level, a specific example is now provided. There are many ways in which speech processing system 100 may adjust its parameters 305 to consume more system resources in order to improve processing quality. Likewise system 100, can consume fewer system resources and, therefore, potentially reduce speech processing quality. In one embodiment system's 100 search space pruning mechanism can be altered to increase or decrease the systems computation (CPU usage). Speech recognition system 100 converts speech to a sequence of words. This sequence of words is one of many possible sequences permitted by the grammar used by the speech recognition system. Speech recognition system 100 can save CPU resources by removing from consideration some of the possible word sequences. Possible word sequences are removed early on in its processing of a given sentence, if processing at that point indicates that these sequences are less likely than others to be the final recognition result. When speech recognition system 100 discards a sequence, it may make a speech recognition search error (here referred to as a pruning error) if the sequence discarded was the word sequence that would have ultimately been chosen by the system had it not been discarded. The number of sequences considered or discarded is affected by the parameters of the search space pruning mechanism. Decreasing the pruning, results in more sequences considered, which results in more computation (CPU usage), and accordingly, fewer potential errors. Conversely, increasing the pruning reduces the amount of computation (CPU usage), but may reduce the speech recognition accuracy of the system as well.

As an example of how the speed/accuracy trade-off works in a speech recognizer, such as recognizer 311 consider a recognizer which uses the well-known Viterbi beam search as the search strategy, although other search algorithms have similar trade-offs, and are contemplated to be within the scope of the present method and system. A key parameter in the Viterbi search is the beamwidth used to control the degree of search space pruning.

During the search, the hypotheses under consideration at a particular time all have scores relating to how likely it is that the hypothesis is the correct answer. Under the Viterbi search, the best scoring hypothesis at a particular instance is determined. A threshold is then set at this score minus the beamwidth. The "beam" is the range of scores between the best score and the threshold. Any hypothesis with scores not within this beam is removed (pruned) from the search.

The smaller the beamwidth the more hypotheses are pruned, leaving fewer hypotheses to be considered for further processing. However, if the true hypothesis is outside of the beam, then this will be pruned, and it will be impossible for the recognizer to obtain the true answer. The smaller the beam the more likely this is to happen, and the accuracy will be reduced. Thus the "beamwidth" is one example of a configuration parameter used to control the speed/accuracy tradeoff.

Many configuration parameters 305 can be tuned as described above. In one embodiment configuration parameters for beamwidth pruning are tuned. The recognition search can be run at a very high pruning beam, recording at each time the probabilities for all word sequence hypotheses in the beam. A post-recognition analysis determines:
  a) What optimum pruning level would result in the same result with the least amount of computation?
  b) In supervised mode—what pruning level would keep the correct answer?

The beam pruning prunes out any hypotheses more than a given distance from the best hypothesis at each frame. The auto-tune process computes the maximum, over all the speech frames, of the distance the word sequence hypothesis representing the reference result falls below the best scoring hypothesis at each frame. All hypothesis paths are considered since the high beam can keep some hypothesis around which initially score low (so would be pruned), but then becomes the best hypothesis later on.

The hypothetical statistics are generated on a per grammar or dialogue state basis. The statistics for each hypothesis will accumulate such information as:
  1. Number of times grammar used;
  2. Number times matched assumed truth; and
  3. Statistics on the amount of computation used with this candidate (average amount of computation, variance, min/max usage values etc.) plus any other information that is relevant to determining the candidates operating point based on the objective function.

Given these statistics it is possible to determine the impact of using each hypothetical configuration in terms of impact on accuracy, and impact on CPU.

In another embodiment, configuration parameters for phonetic lookahead pruning are tuned. This may be described as model-based search space pruning. There is a computation cost to computing the phonetic look-ahead pruning levels, but this cost is typically offset by savings in future computation resulting from fewer hypotheses being computed. In some cases the cost of computing the phonetic lookahead pruning levels is actually more than the savings gained.

The recognition search can be run with phonetic lookahead pruning off, but also accumulating the statistics required for phonetic lookahead pruning. A post-recognition analysis could then compute the cost of computing the hypothesis which would otherwise be pruned out by the phonetic lookahead pruning, against the cost of computing the phonetic lookahead pruning needed to prune out the hypothesis.

In alternate embodiments, the methods described above can be used for other recognition configuration parameters which affect the search or computation e.g. word-transition weights, language model weights, and frame-sampling rates. It is envisioned that this approach could also be used to tune other parameters in the system (such as statistical language model (SLM) probabilities), and even pronunciations in a supervised manner. An SLM is a type of recognition grammar which specifies a probability for every possible word sequence. Typical examples of SLMs are word trigram language models.

In another embodiment the tuner 130 may use different processing strategies, which differ in computational cost. Examples of this would be to change the acoustic models used for speech recognition to include models with more parameters, to include models adapted specifically to the current caller (caller 151–155), or different recognition algorithms.

The foregoing has described a system and method for automatically optimizing recognition configuration parameters for speech recognition systems. It is contemplated that changes and modifications may be made by one of ordinary skill in the art, to the materials and arrangements of elements of the present invention without departing from the scope of the invention.

We claim:

1. A method comprising:
  receiving an utterance at a speech recognizer which has a learning mode;
  generating a recognition result for the utterance with the speech recognizer in the learning mode;
  executing a process to generate a set of tuned recognizer configuration parameters with the speech recognizer in the learning mode in response to the utterance, the process including
    simulating a plurality of candidate configurations of the speech recognizer, each of the candidate configurations including a configuration of one or more configuration parameters potentially affecting performance of the speech recognizer,
    gathering per-utterance statistics associated with the utterance for each of the candidate configurations, and
    using the statistics to generate the set of tuned recognizer configuration parameters; and
  adopting the set of tuned recognizer configuration parameters as a set of recognizer configuration parameters to be used by the speech recognizer for a future utterance.

2. The method of claim 1, wherein the tuned configuration parameters include explicit and implicit configuration parameters.

3. The method of claim 1, wherein the recognizer configuration parameters control one or more of: beam pruning, phonetic lookahead pruning, grammar weights, word transition weights, frame/sampling rates, and pronunciations.

4. The method of claim 1, wherein the learning mode is entered into by the recognizer at one or more instance, including;
  an early phase of a first deployment of the recognizer;
  when the recognizer's computational load is low;
  periodically when triggered by an event; and
  at one or more times specified by a system developer.

5. The method of claim 1, wherein running the speech recognizer in learning mode is performed on-line during a live-deployment.

6. The method of claim 1, wherein the running the speech recognizer in learning mode is performed during an off-line process.

7. The method of claim 1, wherein running the speech recognizer in learning mode is performed on a per-recognition task basis wherein the recognition task basis includes single dialogue states, multiple dialogue states and whole applications.

8. The method of claim 1, wherein running the speech recognizer in learning mode is performed to maintain a predetermined accuracy level of the recognizer.

9. The method of claim 1,
  wherein executing the process to generate a set of tuned recognizer configuration parameters further comprises:
  generating a statistic history by combining the per-utterance statistics with previous per-utterance statistics;
  using the statistic history to generate the set of tuned recognizer configuration parameters.

10. The method of claim 9, wherein said process to generate the set of tuned recognizer configuration parameters further comprises:
  determining if each candidate configuration produces an erroneous recognition result or a reference recognition result.

11. The method of claim 10, further comprising the recognizer receiving the reference recognition result from a source external to the speech recognizer.

12. The method of claim 10, wherein the per-utterance statistics include:
   an identity of grammar used;
   a matching decision, wherein the recognizer determines whether the recognition result generated by the candidate configuration matches the reference recognition result; and
   computational load statistics, including CPU usage and a number of computations.

13. The method of claim 10, further comprising the recognizer automatically selecting the reference recognition result.

14. The method of claim 13, further comprising requesting validation of the reference recognition result from a speaker who spoke the utterance.

15. The method of claim 13, further comprising deciding whether to use the reference recognition result based on a confidence score.

16. A machine-readable medium having stored thereon a plurality of instructions, which when executed by a machine, cause said machine to perform a process to automatically generate a set of tuned configuration parameters for a speech recognizer, the process comprising:
   in response to an utterance being received by the speech recognizer, with the speech recognizer in a learning mode,
      generating a recognition result for the utterance;
      simulating a plurality of candidate configurations of the speech recognizer, each of the candidate configurations including a configuration of one or more recognizer configuration parameters potentially affecting performance of the speech recognizer,
      gathering per-utterance statistics associated with the utterance for each of the candidate configurations, and
      using the statistics to generate the set of tuned recognizer configuration parameters; and
   adopting the set of tuned recognizer configuration parameters as a set of recognizer configuration parameters to be used by the speech recognizer for a future utterance.

17. The machine-readable medium of claim 16, wherein the tuned recognizer configuration parameters include explicit and implicit configuration parameters.

18. The machine-readable medium of claim 16, wherein the recognizer configuration parameters control one or more of: beam pruning, phonetic lookahead pruning, grammar weights, word transition weights, frame/sampling rates, and pronunciations.

19. The machine-readable medium of claim 16 wherein the learning mode is entered into by the recognizer at one or more instance, including:
   when the recognizer's computational load is low;
   periodically when triggered by an event; and
   at times specified by a system developer.

20. The machine-readable medium of claim 16, wherein the running the speech recognizer in learning mode is performed on-line during a live-deployment.

21. The machine-readable medium of claim 16, wherein the running the speech recognizer in learning mode is performed during an off-line process.

22. The machine-readable medium of claim 16, wherein running the speech recognizer in learning mode is performed on a per recognition task basis, wherein the recognition task basis includes single dialogue states, multiple dialogue states, and whole applications.

23. The machine-readable medium of claim 16, wherein running the speech recognizer in learning mode is performed to maintain a predetermined accuracy level of the recognizer.

24. The machine-readable medium of claim 16 having stored thereon additional instructions, wherein said process further comprises:
   generating a statistic history by combining the statistics with previous utterance statistics; and
   using the statistic history to generate the set of tuned recognition configuration parameters.

25. The machine-readable medium of claim 24, wherein said process further comprises:
   determining if each candidate configuration produces an erroneous recognition result or a reference recognition result.

26. The machine-readable medium of claim 25, wherein the reference recognition result is provided by a source external to the speech recognizer.

27. The machine-readable medium of claim 25, wherein the reference recognition result is selected automatically by the recognizer.

28. The machine-readable medium of claim 27, wherein the reference recognition result selected by the recognizer is validated by a caller who provided the utterance.

29. The machine-readable medium of claim 27, wherein said process further comprises deciding whether to use the reference recognition result based on a confidence score.

30. The machine-readable medium of claim 27, wherein the per-utterance statistics include,
   an identity of grammar used;
   a matching decision, wherein the recognizer determines whether the recognition result generated by the candidate configuration matches the reference recognition result; and
   computational load statistics, including CPU usage and a number of computations.

31. A system comprising:
   means for receiving an utterance at a speech recognizer which has a learning mode;
   means for generating a recognition result for the utterance with the speech recognizer in the learning mode in response to the utterance;
   means for generating a set of tuned recognizer configuration parameters with the speech recognizer in the learning mode in response to the utterance, including
      means for simulating a plurality of candidate configurations of the speech recognizer, each of the candidate configurations including a configuration of one or more configuration parameters potentially affecting performance of the speech recognizer,
      means for gathering per-utterance statistics associated with the utterance for each of the candidate configurations, and
      means for using the statistics to generate the set of tuned recognizer configuration parameters; and
   means for adopting the set of tuned recognizer configuration parameters as a set of recognizer configuration parameters to be used by the speech recognizer for a future utterance.

32. The system of claim 31, wherein the tuned recognizer configuration parameters include explicit and implicit configuration parameters.

33. The system of claim 31, wherein the recognizer configuration parameters control one or more of: beam pruning, phonetic lookahead pruning, grammar weights, word transition weights, frame/sampling rates, and pronunciations.

34. The system of claim 31, wherein the learning mode is entered into by the recognizer at one or more instance, including;
   an early phase of a first deployment of the recognizer;
   when the recognizer's computational load is low;
   periodically when triggered by an event; and
   at one or more times specified by a system developer.

35. The system of claim 31, wherein means for running the speech recognizer in learning mode is used on-line during a live-deployment.

36. The system of claim 31, wherein the means for running the speech recognizer in learning mode is used during an off-line process.

37. The system of claim 31, wherein means for running the speech recognizer in learning mode is used on a per-recognition task basis wherein the recognition task basis includes single dialogue states, multiple dialogue states and whole applications.

38. The system of claim 31, wherein means for running the speech recognizer in learning mode is used to maintain a predetermined accuracy level of the recognizer.

39. The system of claim 31, wherein the means for generating a set of tuned recognizer configuration parameters further comprises:
   means for generating a statistic history by combining the per-utterance statistics with previous per-utterance statistics; and
   means for using the statistic history to generate the set of tuned recognition configuration parameters.

40. The system of claim 39, wherein means for running the speech recognizer in learning mode, further comprises:
   means for determining if each candidate configuration produces an erroneous recognition result or a reference recognition result.

41. The system of claim 40, further comprising means for obtaining the reference recognition result from a source external to the speech recognizer.

42. The system of claim 40, wherein the per-utterance statistics include,
   an identity of grammar used;
   a matching decision, wherein the recognizer determines whether the recognition result generated by the candidate configuration matches the reference recognition result; and
   computational load statistics, including CPU usage and a number of computations.

43. The system of claim 40, wherein the reference recognition result is selected automatically by the recognizer.

44. The system of claim 43, further comprising means for obtaining validation of the reference recognition result from a speaker who spoke the utterance.

45. The system of claim 43, further comprising means for deciding whether to use the reference recognition result based on a confidence score.

46. A speech recognizer comprising:
   a word dictionary;
   a grammars library;
   an acoustic models library; and
   a search engine to input an utterance, to obtain from the acoustic models library an acoustic model associated with the utterance, to obtain grammars from the grammar library, to obtain words from the word dictionary, to recognize the utterance using one or more of the obtained acoustic model, grammars, and words, and to execute a process to generate a set of tuned recognizer configuration parameters in response to the utterance while the speech recognizer is in a learning mode, said process including
      simulating a plurality of candidate configurations of the speech recognizer, each of the candidate configurations including a configuration of one or more configuration parameters potentially affecting performance of the speech recognizer,
      gathering per-utterance statistics associated with the utterance for each of the candidate configurations, and
      using the statistics to generate the set of tuned recognizer configuration parameters; and
   the speech recognizer further adopting the set of tuned recognizer configuration parameters as a set of recognizer configuration parameters to be used by the speech recognizer for a future utterance.

47. The speech recognizer of claim 46, wherein the search engine comprises a processor and a memory coupled to the processor.

* * * * *